Oct. 12, 1926.

H. O. HOVDE

COUPLING

Filed May 10, 1926

1,602,979

Inventor
H. O. Hovde
by his Attorneys
Baldwin Wight

Patented Oct. 12, 1926.

1,602,979

UNITED STATES PATENT OFFICE.

HAKON O. HOVDE, OF MESA, ARIZONA.

COUPLING.

Application filed May 10, 1926. Serial No. 108,020.

This invention relates to a coupling especially intended for wagons, thrashing machines or other similar wheeled vehicles which may be hauled either by trucks, tractors, or animal power. It is frequently the case that it is necessary to move such vehicle from the field to the highway by means of animal power and thereafter attach the same to a truck or tractor in order to complete the movement thereof to its destination. Where animal power is used it is necessary to have a usual wagon tongue of considerable length, while when it is desired to convert the vehicle into a trailer for attachment to a tractor or preceding similar vehicle, not only should the tongue be relatively short but there should be some means providing for ready attachment to the preceding vehicle.

This invention provides such a means which is simple in construction, inexpensive in manufacture, and efficient in operation.

Figure 1:
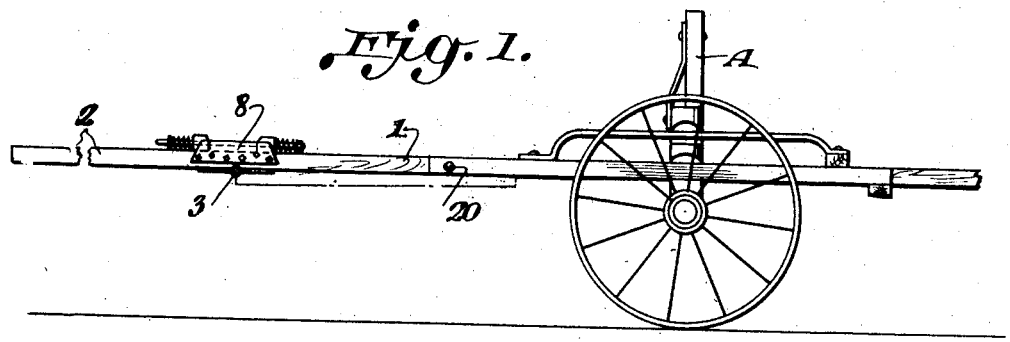
Figure 1 is a side elevation of the front part of a conventional wheeled vehicle and the tongue, together with the construction constituting the invention.
Figure 2:
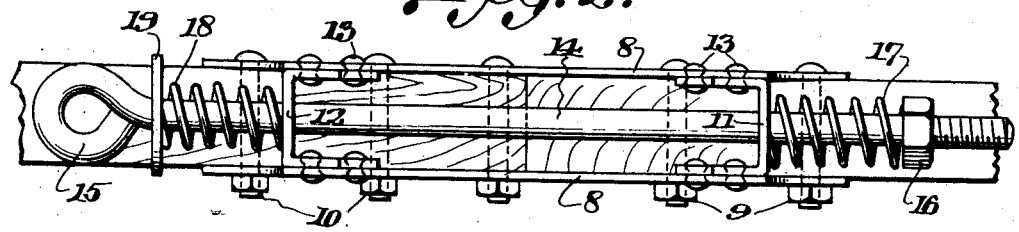
Figure 2 is a top plan view of the invention.

The front part of any conventional wheeled vehicle is indicated at A and this has a tongue composed of two sections 1 and 2. These are fastened together by hinge 3, one strap 4 of which is attached by screws 5 or similar fastening means to the section 2 of the tongue proper, while the other strap 6 is fastened by similar screws 7 to the other section 1 of said tongue.

Two metal plates 8 of any desired form are fastened to the sides of the tongue section 1 by means of bolts 9 or similar fastenings and these plates extend above the upper surface of the tongue member 1. When the tongue member 2 is in use it is fastened to these plates by similar bolts 10.

Two U-shaped members 11 and 12 fit within the upper sides of the side plates 8 and rest upon the top of the tongue members 1 and 2 and are fastened to the side members 8 by rivets 13 or similar fastening means. These U-shaped members 11 and 12 are provided in their base portions with openings through which passes a long bolt 14 provided at its front end with an eye 15 and threaded at the rear end for the reception of nut 16. A spring 17 is interposed between the nut 16 and the base of the U-shaped member 11. A similar spring 18 is interposed between the base of the U-shaped member 12 and a washer 19 adjacent the eye 15.

Figure 3:
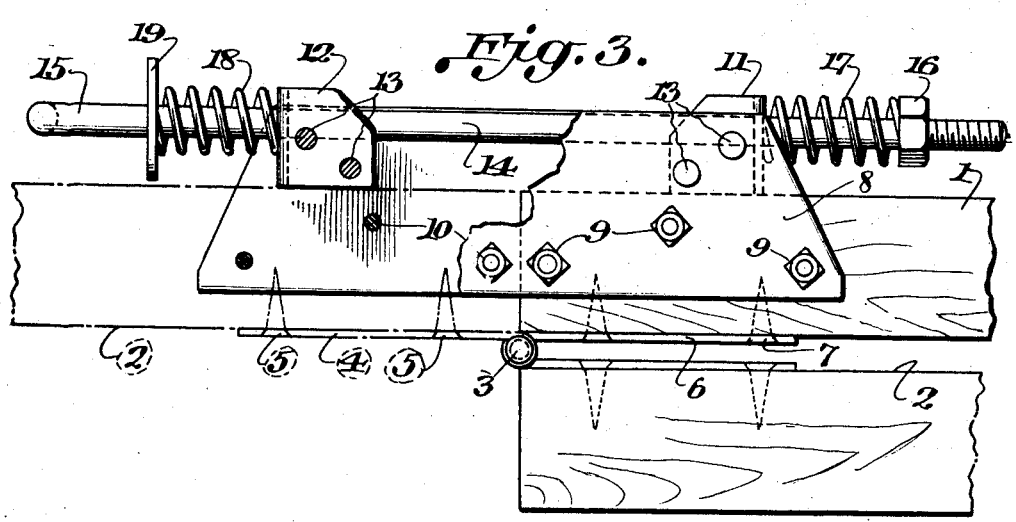
Figure 3 is a side elevation on an enlarged scale with parts broken away and parts in section.

When the parts are in the position shown in Figure 1, the tongue is of the usual length provided for use in transporting the vehicle by animal power. When it is desired to connect the vehicle to a tractor or preceding vehicle, the bolts 10 are removed and the front section 2 turned backward about the hinge 3 from the dotted line position of Figure 3 to the full line position or from the full line position of Figure 1 to the dotted line position in that figure and may be held in this position by any desired fastening means. The tractor or preceding vehicle may then be connected in the usual manner by the eye 15. The springs 17 and 18 are normally not under tension. When a pull is exerted upon the bolt 14 the spring 17 will be somewhat compressed, thus cushioning any jerks or sudden shocks in the transportation of the vehicle, while if it is desired to back the vehicle the spring 18 will be compressed and perform a similar function.

If desired, the portion 1 of the tongue may be pivoted to the rear part thereof as indicated at 20 in order to facilitate the folding movement of the parts 1 and 2. It is also obvious that the hinge may be omitted and the part 2 removed entirely when it is desired to transport the vehicle by aid of a tractor. However, the construction illustrated is preferable, since it retains the tongue extension where it cannot be lost and will be readily available for use whenever desired.

It is obvious that the details of the construction may be widely varied without in any way departing from the spirit of the invention which is to be regarded as limited only by the scope of the appended claims.

I claim:—

1. A coupling for vehicle tongues comprising two tongue sections, side plates adapted to be fastened thereto, members connecting said side plates, a draw bar carried by said members, and springs cushioning the movement of the draw bar in either direction.

2. A coupling for vehicle tongues comprising two tongue sections, side plates adapted to be fastened thereto, U-shaped members fitting between said side plates and fastened thereto and provided with registering openings, a draw bar passing through said openings, and springs cushioning the movement of the draw bar in either direction.

3. A coupling for vehicle tongues comprising two tongue sections hinged together to permit one to be folded upon the other, side plates fastened detachably to said sections, members fastened to said side plates, a draw bar carried by said members and provided with an eye at one end, and springs cushioning the movement of the draw bar in either direction.

In testimony whereof, I have hereunto subscribed my name.

HAKON O. HOVDE.